United States Patent [19]

Chao

[11] Patent Number: 4,855,999
[45] Date of Patent: Aug. 8, 1989

[54] DTDM MULTIPLEXER WITH CROSS-POINT SWITCH

[75] Inventor: Hung-Hsiang J. Chao, Madison, N.J.

[73] Assignee: Bell Communications Research, Inc., Livingston, N.J.

[21] Appl. No.: 118,979

[22] Filed: Nov. 10, 1987

[51] Int. Cl.[4] .............................. H04J 3/04; H04J 3/22
[52] U.S. Cl. ........................................ 370/112; 370/84
[58] Field of Search ..................... 370/112, 58, 80, 84, 370/65; 340/825.79, 825.89

[56] References Cited

U.S. PATENT DOCUMENTS

| | | | |
|---|---|---|---|
| 3,194,889 | 7/1965 | McAdams | 370/112 |
| 4,074,072 | 2/1978 | Christensen et al. | 370/65 |
| 4,146,748 | 3/1979 | Troost et al. | 370/65 |
| 4,599,721 | 7/1986 | Murray | 370/112 |
| 4,616,358 | 10/1986 | Rehm et al. | 370/112 |
| 4,651,319 | 3/1987 | Boulds | 370/112 |

OTHER PUBLICATIONS

R. W. Muise et al., "Experiments in Wideband Packet Technology", Proc 1986, International Zurich Seminar on Digital Communications, pp. 136–138.
W. W. Chu, "A Study of Asynchronous Time Division Multiplexing for Time Sharing Computer Systems", Proc AFIPS, vol. 35, pp. 669–678, 1969.
A. Thomas et al., "Asynchronous Time Division Techniques: An Experimental Packet Network Integrating Video Communication", Proc International Switching Symposium, May 1984.

*Primary Examiner*—Robert L. Griffin
*Assistant Examiner*—Wellington Chin
*Attorney, Agent, or Firm*—James W. Falk

[57] ABSTRACT

A multiplexer for combining a plurality of relatively sparsely occupied DTDM bit streams into a smaller number of more densely occupied DTDM bit streams at the same bit rate is disclosed. The input lines of the multiplexer are divided into groups so that DTDM frames arriving on the input lines in one group are combined to form one outgoing DTDM bit stream. The outgoing DTDM bit streams are formed by synchronously generating chain of empty frames for each of the input line groups. The frames in a chain are passed to a first member of the appropriate input line group and by means of a cross-point switch to each succeeding member for the insertion of data. The groupings of input lines are defined by the settings of the cross-point switch and may be rearranged by changing the settings of the switch.

7 Claims, 10 Drawing Sheets

DTDM MULTIPLEXER WITH CROSS-POINT SWITCH

RELATED APPLICATIONS

The following applications contain subject matter related to the subject matter of the present application, are assigned to the assignee hereof and have been filed on the same date as the present application.

1. H. J. Chao, S. H. Lee, L. T. Wu, "Dynamic Time Division Multiplexing, having Ser. No. 118,977".
2. M. W. Beckner, F. D. Porter, K. Shu, "DTDM Multiplexing Circuitry, having Ser. No. 118,897".
3. H. J. Chao, S. H. Lee, "Time Division Multiplexer for DTDM Bit Streams, having Ser. No. 118,978".
4. M. W. Beckner, T. J. Robe, L. S. Smoot, "Framer Circuit, having Ser. No. 118,898.

FIELD OF THE INVENTION

The present invention relates to a data transmission technique referred to herein as Dynamic Time Division Multiplexing (DTDM) and a set of multiplexers and demultiplexers required to apply DTDM in an actual telecommunications network. DTDM is capable of effectively handling both circuit and packet traffic and thus provides a migration strategy between the present circuit switched telephone network and the future broadband packet switched network. More particularly, the present invention relates to a multiplexer for combining a plurality of relatively sparsely occupied DTDM bit streams into a smaller number of more densely occupied DTDM bit streams at the same bit rate.

BACKGROUND OF THE INVENTION

Presently, there are significant uncertainties when it comes to predicting the future demand for broadband telecommunications services such as high definition video and interactive data communications. This uncertainty in the future demand for broadband telecommunications services has a significant impact on the design of public telephone networks. First, to satisfy the unknown growth pattern in future service demands, it is desirable to have a robust network design that can be easily modified in response to changes in demand for particular telecommunications services. Second, the network must be able to handle vastly different types of traffic ranging from low speed data and voice to full motion video. Third, depending on the demand for wideband services, a network design must be capable of providing a migration strategy from existing copper wires and circuit transmission and switching facilities to optical fibers and the succeeding generations of high speed packet transmission and switching facilities, which packet facilities are used in connection with the delivery of wideband telecommunications services. These three criteria determine the selection of the three major components of a network design: network topology, transmission systems and switching systems. Here, the concern is primarily with transmission systems and transmission techniques which meet the foregoing criteria.

Two important types of commercially used transmission systems are circuit systems and packet systems. Typically, circuit systems utilize time division multiplexing (TDM) as a transmission technique. When TDM is used, each data stream comprises frames which are subdivided into slots. Corresponding slots in each frame are allocated to specific connections. For example, the first slot in each frame is allocated to one specific connection and the second slot in each frame is allocated to a second connection, etc. Each frame also includes a field which contains transmission overhead information including frame synchronization words and control words. This traditional circuit transmission format can be extended to multiple bit rate services by allocating multiple slots in each frame to high bandwidth services. In such circuit transmission systems, a combination of space division switching and time division switching is utilized at the network switches to swap time slots between various bit streams so that connections to and between specific subscribers are established.

Historically, the first digital circuit transmission systems were introduced during the 1960's. These first digital circuit transmission systems were introduced in inter-office trunking applications to carry 24 voice channels by a single 1.544 Mb/sec digital stream. This is known as the DS-1 signal. Subsequently, the wide deployment of digital channel banks in the public telephone network required the multiplexing of several DS-1 signals into a higher speed bit stream to efficiently utilize available transmission links. As the network grew further, continuing efforts to effectively multiplex tributaries having different bit rates into a common bit stream resulted in the well-known hierarchical multiplexing plan comprising the DS-1 (1.544 Mb/sec), DS-1C (3.152 Mb/sec), DS-2 (6.312 Mbit/sec), DS-3 (44.736 Mb/sec) and DS4 274.176 Mb/sec signals.

Conventional circuit transmission systems suffer from a number of shortcomings. Perhaps the most important problem is the multiplexing hierarchy itself. An important result of the hierarchy is an inherent lack of flexibility. Since the network can only transmit the set of signals in the hierarchy, every telecommunications service has to meet the stringent interface requirement of given hierarchical signal bit rates, instead of the particular service being able to transmit at its own natural bit rate. Therefore, the packet mode of transmission which is inherently bit rate flexible is favored for future broadband network which are to be adapted to deliver enhanced telecommunication services such as high definition video and interactive data communications.

In contrast with circuit transmission systems which transmit data in frames subdivided into slots, packet transmission systems transmit data in discrete blocks or packets, with each packet having an address header at the front thereof. At the network switches, packets are routed from a specific input line to a specific output line, based on address information contained in the packet header. In this way data packets can be routed from a particular subscriber location, through a telecommunications network, to another subscriber location. Packet transmission techniques and especially fast packet transmission techniques (see e.g., R. W. Muise et al., "Experiments in Wideband Packet Technology", Proc 1986 International Zurich Seminar on Digital Communications, pp. 136–138) are inherently bandwidth flexible (i.e. the number of packets generated by a given service per unit time is flexible) and thus are suitable for wideband enhanced communications services. Accordingly, it is desirable to introduce packet transmission technology into the public telephone network, which up to now is based primarily on circuit transmission technology.

The commonly-held view as to how to introduce packet technology into the public network is to deploy a packet overlay network because the existing network is optimized for circuit transmission and is therefore incompatible with packet transmission techniques. Accordingly, many deployment strategies recommend constructing an overlay packet network for a set of wideband services and hope that the migration of new services to the packet overlay network will allow the existing circuit transmission network to be phased out slowly. The main advantage of a packet overlay network is the quick realization of an end-to-end network for new services. However, the approach requires a large initial capital investment and increases operational cost by requiring the management of multiple separate networks.

Accordingly, it is desirable to provide an alternate approach for introducing packet transmission technology into the public telephone network, which approach requires the replacement of existing transmission components but not the implementation of an entirely new network. Thus, it is desirable to provide a digital data transmission system capable of handling both existing hierarchical circuit traffic and packet traffic.

With regard to the foregoing, it should be noted that recent advances in network switch designs have blurred the distinction between packet networks and circuit networks. A typical switch for use in a telecommunications network has three major components: control processor, switch interfaces, and interconnection network. The control processor handles call set-up and tear-down, maintenance and administrative functions. The switch interfaces convert transmission formats (i.e., the format data has when transmitted between switching nodes) to switch formats (i.e., the format data has when processed within switching nodes). The interconnection network routes information blocks from specific input lines to specific output lines of the switch. For the existing digital circuit systems used in the public telephone network, the information in a specific time slot on an incoming line is transferred, via the switch, to a specific time slot on an outgoing line. Thus, the interconnection network serves as a cross-connect for the incoming signals on a slot-by-slot basis.

It has recently been shown (see e.g., Day-Giacopelli-Huang-Wu, U.S. patent application Ser. No. 021,664 entitled Time Division Circuit Switch, filed on Mar. 4, 1987, and assigned to the assignee hereof) that a switch for use in a circuit network can be built using a self-routing packet interconnection network. An example of such a self-routing packet network is the Batcherbanyan network. Based on the address headers associated with fixed sized packets, the Batcher-banyan network routes a plurality of packets in parallel to specific destination addresses (i.e., specific output lines) without internal collisions. Thus, to mimic the operation of the conventional time-space-time switches used in circuit networks, switch interfaces are provided which perform the time slot interchange function and which are able to insert headers in front of circuit slots to convert such slots into packets for routing through the self-routing interconnection network and able to remove headers from packets leaving the self-routing interconnection network to reconvert packets back into conventional circuit time-slot format.

In addition to circuit and packet transmission, another mode of digital transmission is known as Asynchronous Time Division Multiplexing (ATDM). See e.g., W. W. Chu "A Study of Asynchronous Time Division Multiplexing for Time Sharing Computer Systems" Proc AFIPS Vol 35, pp. 669–678, 1969 and A. Thomas et al. "Asynchronous Time Division Techniques: An Experimental Packet Network Integrating Video Communication" Proc International Switching Symposium, May 1984. ATDM is used in connection with continuous and bursty data traffic. ATDM uses channel identifiers with actual data to allow on-demand multiplexing of data from subscriber terminals with low channel utilization. The channel identifiers and associated data form time slots. However, ATDM is bit rate flexible since the appearance of packets can be asynchronous. Slot timing is obtained from a special synchronization pattern which is inserted into unused time slots. Since the synchronization pattern appears only in unused time slots, ATDM cannot be used to carry existing high speed hierarchical signals wherein the loading is close to one hundred percent.

In short, the situation is that the present public telephone network utilizes circuit transmission technology and the associated time division multiplexing transmission techniques, while future broadband services, the demand for which is presently uncertain, are best offered using packet transmission technology. It is therefore an object of the invention to provide a transmission system which is capable of integrating present circuit traffic with future packet traffic so as to provide a flexible migration strategy from the existing copper wire based circuit network to succeeding generations of high bandwidth packet transmission networks. It is a further object of the invention to provide a set of multiplexers and demultiplexers to enable implementation of a particular embodiment of a network utilizing the inventive transmission system.

SUMMARY OF THE INVENTION

The digital network transport system, referred to herein as Dynamic Time Division Multiplexing (DTDM), is a flexible network transport system capable of effectively handling both circuit and packet traffic. By combining conventional time division multiplexing techniques and packet transmission techniques, DTDM enables a flexible transition from the existing circuit type networks to future broadband packet transmission networks.

In a network utilizing DTDM, each transmission bit stream is divided into frames. These frames are the fundamental unit of data transport in DTDM. Each such frame comprises two fixed length fields: overhead and payload. The overhead field includes, for example, a frame alignment word for frame timing and the empty/full status of the frame. The payload field of each frame may be filled with a data packet including header or a slot from a circuit transmission stream. Before a slot from a circuit transmission stream can be inserted into the payload field of a DTDM frame, it must first be converted into a packet-like form with a header at its front. Viewed another way, each occupied DTDM frame comprises a transmission overhead field, a header field, and a data field. Thus, the DTDM transmission format is a combination of the circuit transmission format and the packet transmission format.

In the DTDM system, packet and circuit traffic can be multiplexed through the same multiplexer. Thus, such a multiplexer can have continuous circuit type tributaries and bursty packet tributaries. To multiplex such diverse traffic, a train of DTDM frames with empty payload fields is generated. This train has a bit rate which defines a basic backbone transmission rate for the DTDM transmission system. Data in the form of packets or circuit slots with headers attached are inserted into the empty frames to form the DTDM bit stream.

An appropriate analogy is as follows. The stream of empty DTDM frames may be analogized to a train of empty freight cars. The empty freight cars are then filled with data from the various tributaries which may have been in circuit or packet format.

Illustratively, a DTDM multiplexer may be used to merge traffic from three different communications sources or tributaries into a single DTDM bit stream. These tributaries may be a digital phone generating 64 Kilobits/sec PCM voice, a graphics terminal sending bursty data at 1 Megabit/sec, and a circuit transmission stream operating at the DS3 rate of about 45 Megabits/sec. Illustratively, the bit rate of the backbone DTDM bit stream is 150 Megabits which yields 144,000 frames per second given a 130-byte frame size. The available frames are shared by the three tributaries by giving higher priority to the circuit tributary, and allowing the voice and graphics tributaries to contend on a first-come, first-served basis. The circuit tributary seizes one out of every three empty frames passing by. Thus the regularity of the circuit transmission will be maintained throughout the DTDM transmission link. Illustratively, the voice source is packetized by accumulating up to 15 milliseconds worth of voice samples before inserting this information into an empty DTDM frame along with a header. In this case the voice tributary will on average seize one out of every 2,160 frames. Similarly, at a rate of 1 Megabit per second, the graphics tributary will fill one frame out of 150. In this way, three diverse data streams are multiplexed into a single bit stream.

As a second example, DTDM can be used as a replacement transmission technology to carry existing inter-office traffic. More specifically, consider the need to multiplex and transmit three hierarchical signals at the DS1, DS2, and DS3 rates, respectively, for point-to-point transmission between two offices. The traditional TDM approach would utilize a step-by-step hierarchical approach to multiplex and to subsequently demultiplex these signals. The conventional hierarchical multiplexing scheme requires line conditioning and synchronization circuitry at each level of the hierarchy as well as hardware for bit interleaving.

In contrast, using a DTDM multiplexer, time slots from each of the three signals would be inserted into the empty frames in a basic DTDM backbone signal. If the backbone signal is 150 megabits per second and comprises 144,000 frames per second, the DS3 signal would require one out of every three DTDM frames, the DS2 signal would require approximately one out of every twenty-one DTDM frames and the DSI signal would require approximately one out of every eighty-four of the empty DTDM frames.

In an actual network, the above-described DTDM streams at the basic backbone bit rate generally contain empty frames; thus DTDM streams may be multiplexed into more densely populated DTDM bit streams at the same bit rate. These more densely populated basic backbone rate bit streams may then be time division multiplexed into higher bit rate streams for point-to-point inter-office transmission.

More particularly, a multiplexer for combining a plurality of relatively sparsely occupied DTDM bit streams into a smaller number of more densely occupied DTDM bit streams at the same bit rate comprises N input lines on which the sparsely occupied DTDM streams arrive and M (M<N) output lines on which the more densely occupied DTDM bit streams leave. The N input lines are divided into M groups, with each group containing J=N mod M inputs. Each group of input lines is associated with one output line. All of the DTDM frames arriving on the input lines of one group are merged into a single DTDM bit stream which leaves via the associated output. DTDM frames arriving on the input lines are converted into byte wide format by means of a serial-to-parallel converter and stored in a buffer.

M chains of empty DTDM frames are generated. These chains ultimately form the outgoing DTDM bit streams. Each chain of frames is associated with one group of input lines. Each chain of frames is passed from one input line in its group to the next by means of a cross point switch with which the input lines are associated. If an empty frame in the appropriate chain arrives at a particular input line (or more particularly at a framer circuit associated with the input line) and there is a data packet from a received DTDM frame in the buffer, the data packet is inserted into the empty DTDM frame. In this way the M outgoing DTDM bit streams are formed.

The use of the cross-point switch enables a particularly flexible multiplexer design. The groupings of the input lines are determined by the settings of the cross-point switch as each train of frames is routed from one input line in its group to the next input line in its group by means of the cross-point switch. Thus based on input traffic statistics it is possible to reassign input lines to different output lines merely by adjusting the settings of the cross-point switch.

DETAILED DESCRIPTION OF THE INVENTION

1. DTDM Transmission Format

Figure 1:
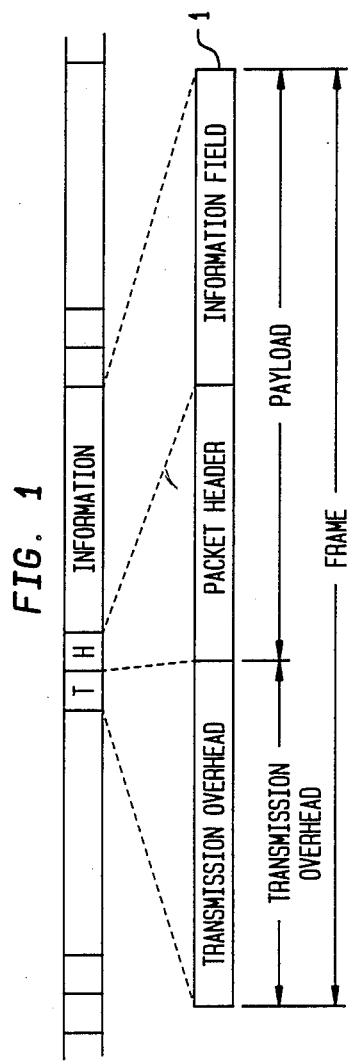
FIG. 1 schematically illustrates the DTDM transmission format.

DTDM is an approach to data transport which can handle both TDM hierarchical signals and packet traffic in a common integrated structure, while allowing complete bit rate flexibility. As illustrated in FIG. 1, the transmission bit stream is divided into frames 1. The DTDM frame is the fundamental unit of information transport in the DTDM transmission scheme. The frames come one after the other so as to form a continuous chain or train.

Each frame 1 comprises two fixed length fields designated transmission overhead (T) and payload in FIG. 1. Illustratively, each frame comprises 130 bytes with 10 bytes being allocated to the transmission overhead field. Typically, the bit rate of the DTDM bit stream illustrated in FIG. 1 is about 150 Megabits/sec. The following information may be available in the overhead field of every DTDM frame; frame alignment word for frame timing, empty/full status of the frame, and span identification.

As shown in FIG. 1, the payload field of each frame may be filled with a data packet including a header (H) or a slot from a circuit transmission stream. However, before a slot from a circuit transmission stream can be inserted into the payload field of a DTDM frame, it must first be converted to packet-like form by the insertion of a header (H) at its front. Viewed another way, each occupied DTDM frame comprises a transmission overhead field, a header field, and an information field. Thus, the DTDM transmission format is a combination of the circuit transmission format and the packet transmission format. The packet header provides information such as channel number, line number, error detection, etc. In general, only the information required in every frame gets permanent bandwidth allocation in the transmission overhead field.

Figure 2:
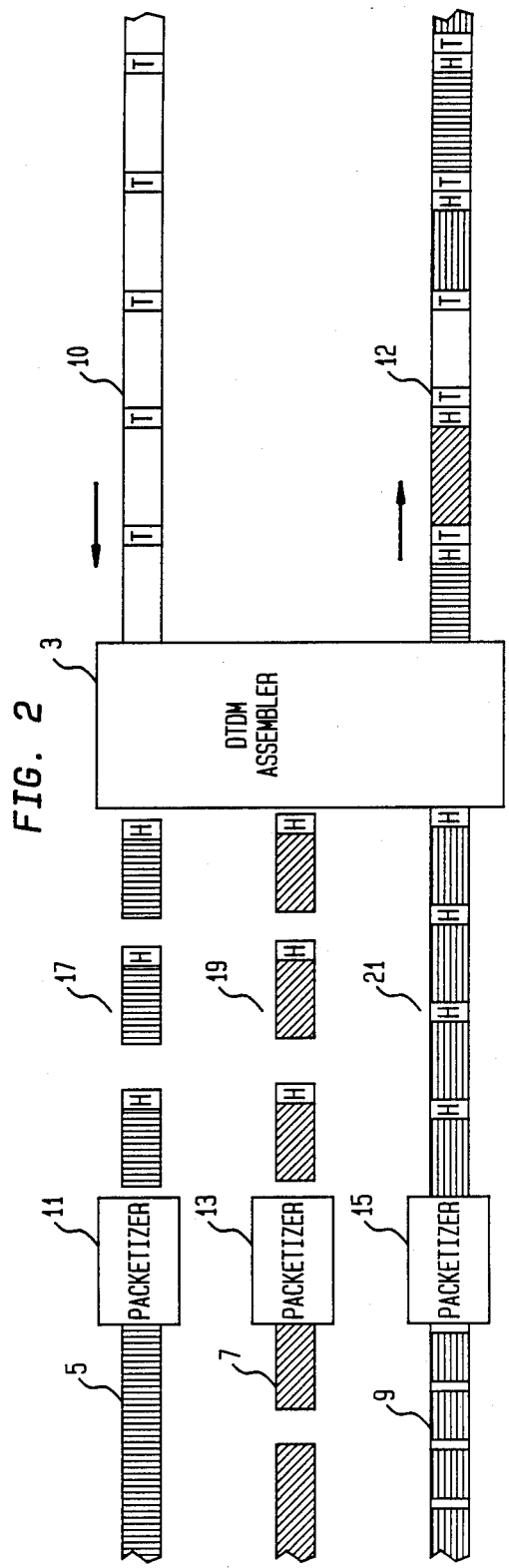
FIG. 2 schematically illustrates the formation of a backbone DTDM bit stream.

FIG. 2 schematically illustrates the formation of a DTDM bit stream. The DTDM bit stream assembler 3 can combine into a single bit stream both continuous circuit tributaries and bursty packet tributaries. Three such tributaries are illustrated in FIG. 2. They are: a digital phone tributary 5 generating 64 Kilobits/sec PCM voice, a tributary 7 from a graphics terminal sending bursty data at one megabit per second, and a circuit transmission stream 9 operating at the DS3 rate of about 45 Megabits/sec. Each of the three tributaries has a characteristic shading in FIG. 2 so that it is possible to follow how data from the three tributaries is combined to form the DTDM bit stream.

To multiplex such diverse traffic, a train 10 of DTDM frames with empty payload fields is generated. This train 10 has a bit rate which defines a basic backbone transmission rate for the DTDM system. Each of the frames in the train 10 has an occupied transmission overhead field (T).

Illustratively, the train of frames has a bit rate of about 150 Megabits per second and comprises 144 K blocks/sec. The assembler 3 serves to insert data from the tributaries 5,7,9 into the payload fields of the DTDM frames in the stream 10. To accomplish this, the tributaries 5, 7, 9 are first packetized using packetizers 11, 13, 15, respectively to form the packetized streams 17, 19, 21. Each packet comprises a header (H) and an information field. In the case of the tributary 5, up to 15 milliseconds of speech samples are accumulated to form a packet. In the case of the circuit tributary each slot is converted to packet form by placing a header at the front thereof.

To form the DTDM stream 10, the packets comprising the streams 17, 19, 21 are inserted into the empty payload fields of the empty frames in the stream 10. The empty frames are shared by the three tributaries by giving higher priority to the circuit tributary 9 and allowing the voice and graphics tributaries 5, 7 to contend for empty frames on a first-come, first-served basis. Thus, the circuit tributary seizes one out of every three frames so that the regularity of the circuit transmission is maintained throughout the DTDM transmission link. Similarly, the voice tributary will seize one out of every 2,160 frames and the graphics tributary will seize on average one out of every 150 frames. It should be noted that the bit stream 12 is not 100% occupied and that some frames remain empty. In this way, three diverse tributaries are multiplexed into a single DTDM bit stream.

2. A Network Utilizing DTDM

Figure 3:
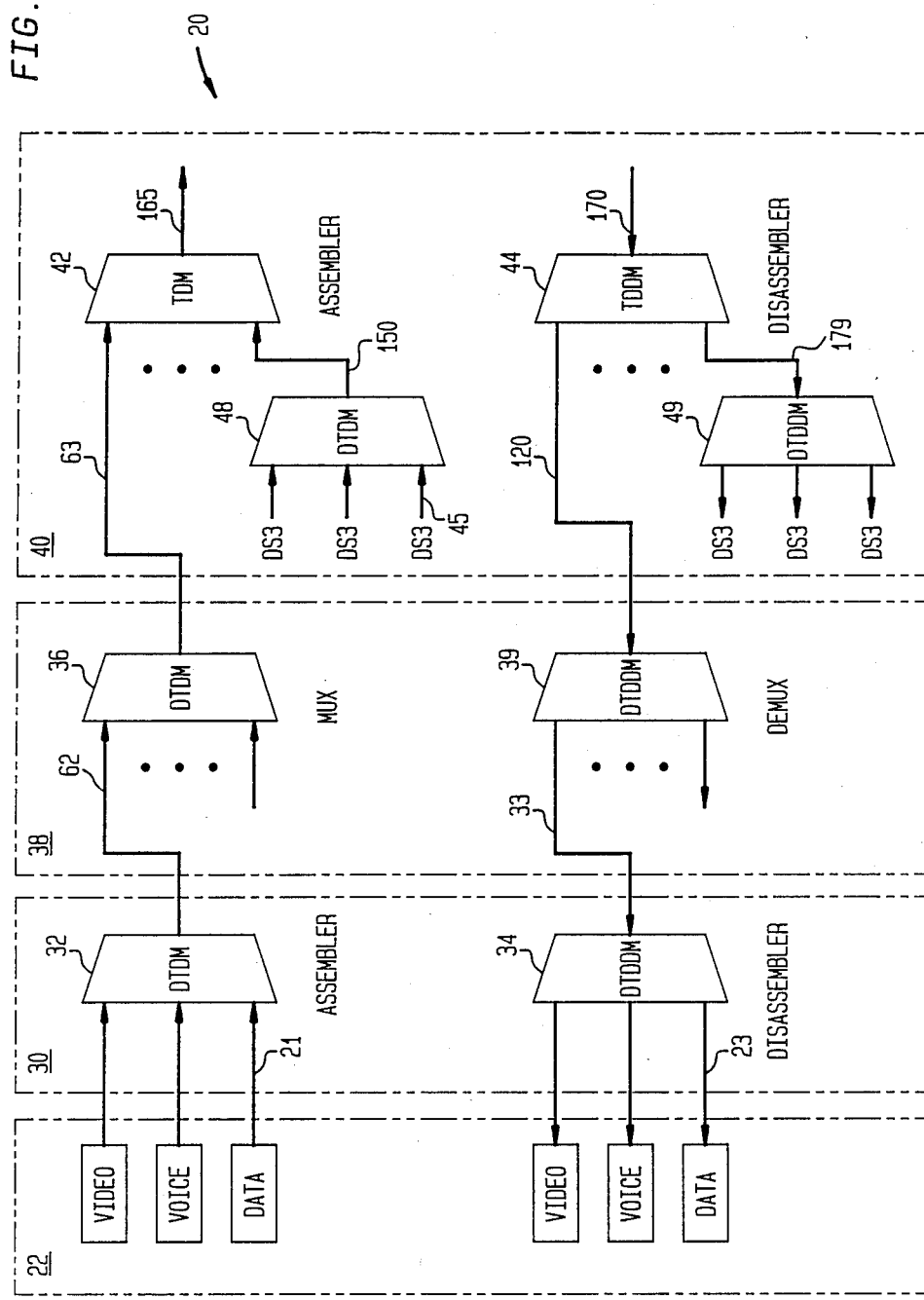
FIG. 3 schematically illustrates an end-to-end network using DTDM.

FIG. 3 schematically illustrates an end-to-end network 20 utilizing DTDM. The network 20 connects to customer premises equipment (CPE) 22, of which three types are illustrated, namely video, voice and data.

In the network 20, three multiplexing stages are required to support end-to-end transport. In the user-network interface stage 30, an assembler 32 receives data streams on lines 21 from the customer premises equipment 2 and combines these streams into a basic backbone DTDM stream of the type discussed in connection with FIGS. 1 and 2. Similarly, disassembler 34 tears apart a basic DTDM bit stream arriving on line 33 and distributes the data to th appropriate customer premises equipment 22 via lines 23.

As indicated above, the DTDM bit stream formed by the assembler 32 is not 100% occupied. Thus the multiplexer 36 in the remote electronics stage 38 is used to combine several DTDM bit streams arriving on lines 62 into a more densely occupied DTDM bit stream of the same bit rate to achieve greater transmission efficiency. Similarly, the demultiplexer 39 separates a densely populated DTDM bit stream arriving on line 120 into less densely populated DTDM bit streams transmitted via lines 33, so that the data contained therein can ultimately be routed to the correct customer premises equipment.

In the point-to-point stage 40, a plurality of DTDM bit streams arriving via lines 63, 150 are time division multiplexed by means of time division multiplexer 42 for high speed point-to- point transmission via line 165 to a network switch (not shown). For example, the multiplexer 42 receives one DTDM stream via a line 63 from multiplexer 36 and another DTDM stream via line 150. The DTDM bit stream transmitted via line 150 is formed by DTDM assembler 48 and contains the data of three DS3 tributaries 45.

Time division demultiplexer 44 receives a high speed bit stream from a switch (not shown) via line 170 and demultiplexes this stream into a plurality of DTDM streams. One DTDM stream containing data for customer premises equipment goes to demultiplexer 39 via line 120 and another DTDM stream comprising DS3 slots goes to disassembler 49 via line 179.

3. DTDM Assembler and Disassembler

The function of the DTDM bit stream assembler 32 of FIG. 3 is to packetize each incoming data stream associated with one particular customer service or transmission channel and then embed these packets into the basic DTDM transmission frames. The assembler 32 is shown in greater detail in FIG. 4.

The assembler 32 comprises a plurality of interface units 50. Each interface unit 50 serves to interface an associated data input 21 with the DTDM bit stream. A DTDM bit stream comprising empty frames with empty payload fields is generated by framer unit 52. A detailed description of the framer unit is provided below.

Each interface unit includes a framer unit 53. The framer units 52, 53 are connected together in a daisy chain fashion. The frames comprising the DTDM bit stream are passed along the daisy chain from one framer unit to the next. More particularly, the DTDM bit stream leaves the serial data output (sdo) of the framer unit 52 and enters the serial data input (sdi) of the topmost framer unit 53. The DTDM bit stream leaves the topmost framer 53 via its serial data output (sdo). The DTDM bit stream then enters the serial data input (sdi) of each succeeding framer unit and leaves via the serial data output (sdo) of each framer unit. The DTDM bit stream leaves the serial data output of the lowermost framer via line 62. As shown in FIG. 3, line 62 serves to transmit the DTDM bit stream to the DTDM multiplexer 36. If the DTDM frame currently located at the framer unit 53 of a particular interface 50 is empty, that interface may insert a packet into the payload field of the DTDM frame.

The data inputs 21 to the assembler 32 are connected to the customer premises equipment 22 of FIG. 3 and may have a wide range of bit rates; for example, the data inputs 21 can be video, voice, data, or different digital hierarchical transmission signals (DS-1, DS-2 and DS-3). Therefore, the assembler architecture must be capable of efficiently accommodating different input bit rates and be flexible enough to allow for future expansion or for the changing of particular input connections to different services. The architecture shown in FIG. 3 provides the capability to easily add or drop a particular input service.

Each input 21 is connected to a packetizer 55 which forms part of the associated interface unit 50. The packetizer 55 puts the incoming data into a packet structure by adding a packet header at the beginning of appropriate segments of the input bit stream. The packet header carries information about the packet, such as packet occupancy, channel identification number, line identification number, check sum and so on. Illustratively, the channel identification number is used to identify the input service from which the packet originated. After the data is put into a packet structure, it is stored in a FIFO 57 with byte wide format. The framer unit 53 then reads the data from the FIFO 57 into its parallel data input (pdi) 58 and generates properly framed data bits which are inserted into an empty payload field of a DTDM frame currently at the particular framer unit 53.

However, a framer unit 53 will not read the data from the FIFO 57 unless two conditions are met. One is that the "packet- ready" pulse signal from the packetizer 55 is asserted, indicating one packet is completely stored in the FIFO. The other condition is that the incoming DTDM frame on the serial data input (sdi) of the framer 53 is not already occupied by a valid packet, i.e. the incoming DTDM frame is empty. Thus, an empty or "emp" signal is transmitted from the framer 53. The "packet-ready" signal triggers an enable signal, "en", in the framer unit to be asserted for the whole frame transmission period allowing the data packet to be moved from the FIFO 57 through the framer 53 and into the DTDM bit stream. Using the "emp" and "en" signals, control logic 59 controls the reading of a packet out of the FIFO 57 and into the framer 53.

Since the framer units 53 are daisy-chained together, the contention for empty DTDM frames is automatically resolved in favor of input services having positions closer to the empty frame generator.

Figure 4:
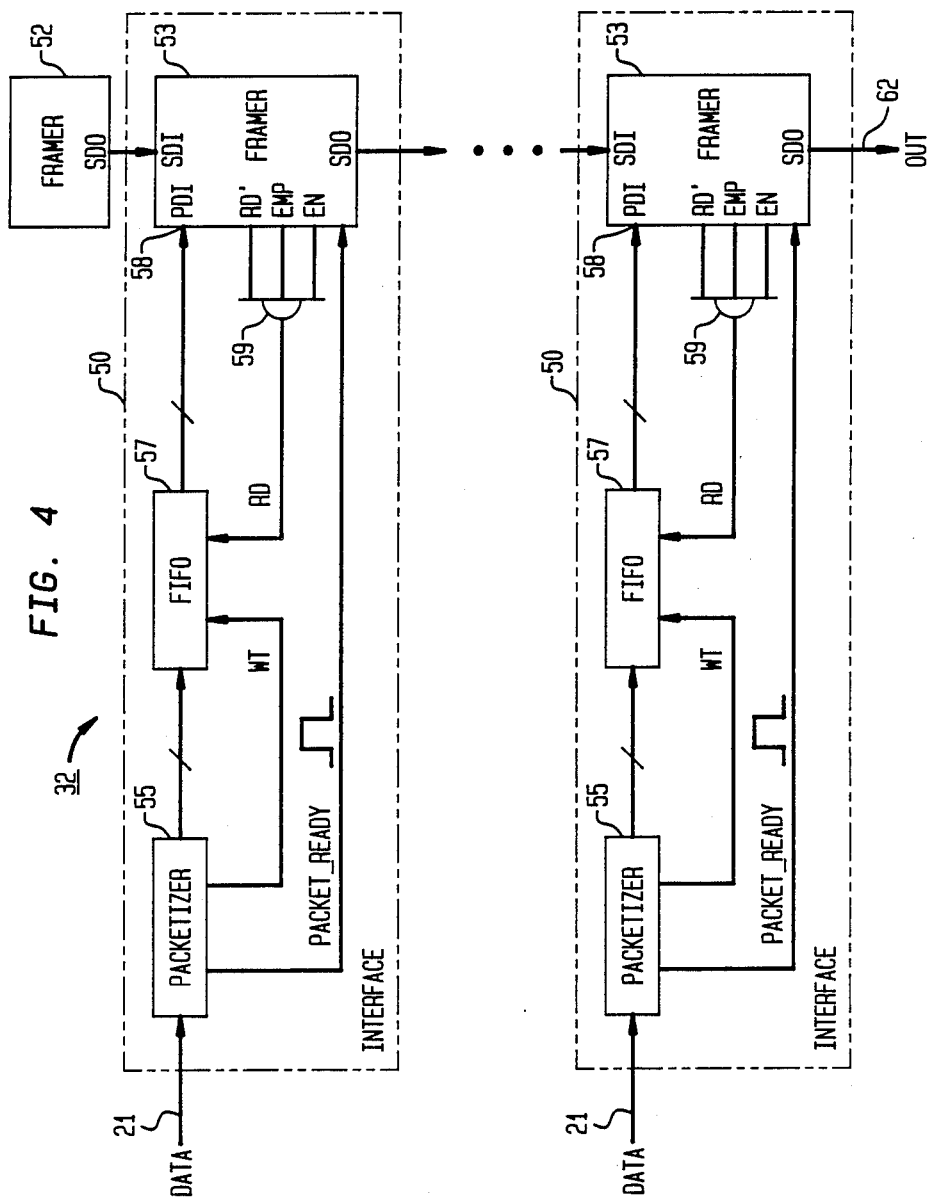
FIG. 4 illustrates an assembler for combining diverse aributary data streams into a single DTDM stream.

In order to simplify the assembler 32 of FIGS. 3 and 4 and hence reduce the building cost, one practical assumption may be utilized. First, the total traffic of all inputs at any given time is less than the bit rate of the basic backbone DTDM stream.

The topmost framer 52 in FIG. 4 does not have any input service connected to it. It generates the chain of empty DTDM frames which are sent to the following framers 53. If none of the interfaces 50 insert a packet into a particular frame, an empty frame is finally sent out through the serial data output (sdo) of the bottom-most framer unit on lead 62.

After the DTDM bit stream has traveled through the entire communications network 20 of FIG. 3, which network includes multiplexers, switches, and demultiplexers, etc., the DTDM bit stream is disassembled and the data distributed to the appropriate customer services equipment. In the network 20 of FIG. 3, the disassembler 34 is used for this purpose. The disassembler 34 is shown in greater detail in FIG. 5. Illustratively, the disassembler 34 removes both the transmission overhead and packet header field from each incoming DTDM frame and distributes the data contained in the frame to the desired customer premises device.

More particularly, the assembler 34 comprises a plurality of interfaces 66. Each interface 66 receives the incoming DTDM bit stream via line 33 (see FIG. 3) and is illustratively connected to one customer premises device via an output lines 23 (see FIG. 3). Each incoming DTDM frame is simultaneously received by the framer unit 70 in each interface 66. However, only packets containing data to be transmitted to the associated customer premises equipment are transferred from the framer 70 to the associated FIFO 72. To accomplish this, the packet occupancy and channel identification number are examined by the framer 70. The framer 70 in turn generates proper control signals via lines 73, which, along with control logic 74, determine whether or not the packet carried in the payload field of the particular DTDM frame will be written into the FIFO 72 of the particular interface unit so that the data contained in the packet can be transmitted to the associated customer premises equipment.

Recovering the correct frequency from the incoming data is a very challenging task. Although for each kind of customer premises equipment or service the frequency is known, the difference between the local reading clock used to read data out of the FIFO 72 and the clock which was used to load data into empty frames at the transmit end may result in overflow or underflow of the FIFO 72. Illustratively, a phase locked loop 79 is used to modify the local reading clock in order to cancel this difference in clock rates.

Figure 5:
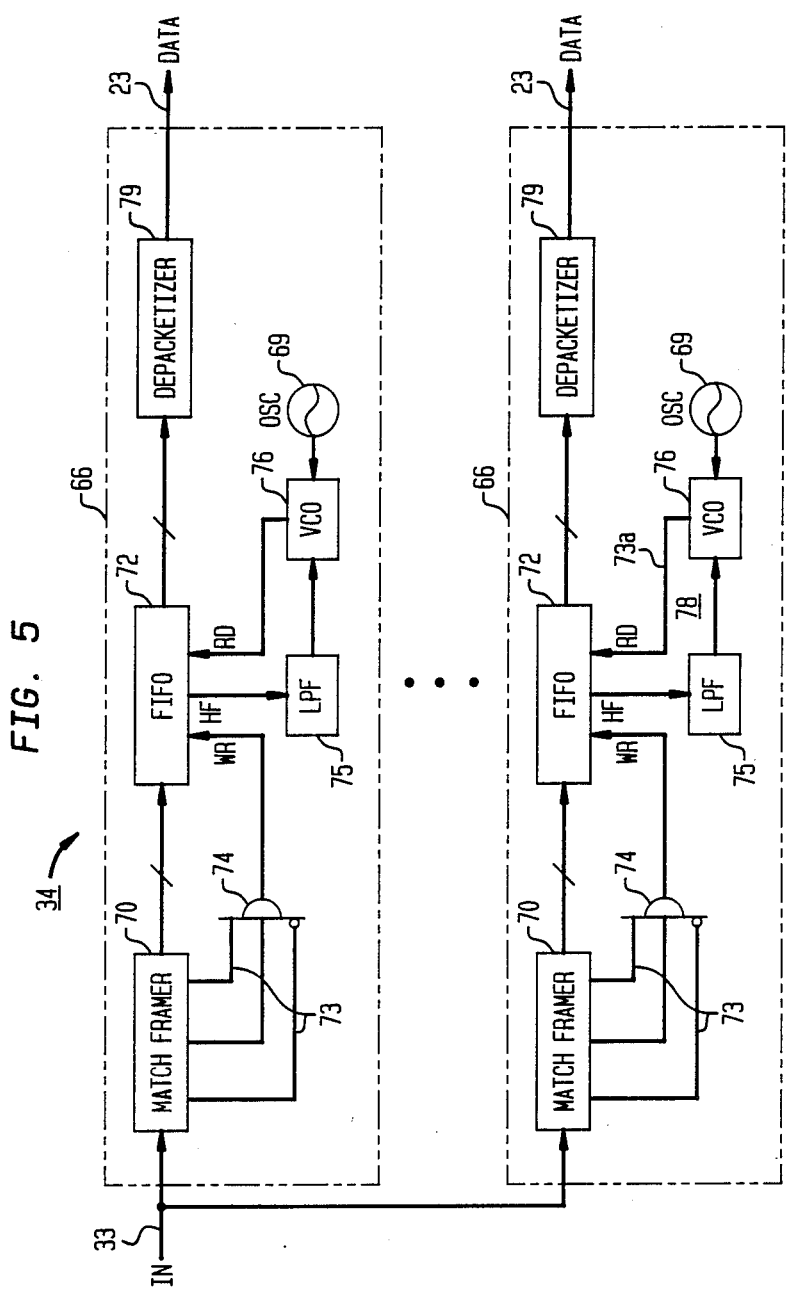
FIG. 5 illustrates a disassembler for separating a DTDM bit stream into diverse tributary data streams.

As shown in FIG. 5, the local reading clock signal (line 73a) used to read data out of the FIFO 72 is phase locked with the incoming data so that the data can be read out correctly from the FIFO 72 without overreading or underreading. The rate at which data is read out of the FIFO is determined by the frequency of the voltage controlled oscillator 76 in the phase locked loop 78.

The packet is written into the FIFO 72 with the network clock rate, but read out at a rate dependent on the particular equipment to which the data is transmitted. An "hf" signal which indicates that the FIFO 72 is half full is smoothed out by a low-pass filter 75 whose output is used to control the output frequency of a voltage-controlled oscillator 76. If information is read out of the FIFO 72 faster than information is written into the FIFO 72, then the "hf" signal will not be asserted. This causes the voltage output from the low-pass filter 75 to decrease, reducing the output frequency produced by the voltage controlled oscillator and reducing the rate at which data is read out of the FIFO 72. Similarly, if information is read out of the FIFO more slowly than it is being written into the FIFO 72, the "hf" signal will be asserted and the voltage controlled oscillator frequency will be increased so that the read clock signal frequency is larger. The same interface unit 66 can be used for different customer premises devices by choosing a proper frequency for oscillator 69.

Data packets read out of the FIFO units 72 are depacketized by means of depacketizer circuits 79 which serve to remove the headers. The resulting data is then transmitted via lines 23 to the appropriate customer premises equipment.

4. DTDM Bit Stream Multiplexer and Demultiplexer

The function of the DTDM bit stream multiplexer 36 of FIG. 3 is to concentrate a plurality of relatively sparsely occupied incoming DTDM streams into at least one more densely occupied DTDM stream of the same bit rate, resulting in more efficient use of the transmission facility. There is more than one architecture for implementing the DTDM multiplexer 36 of FIG. 3.

Figure 6:
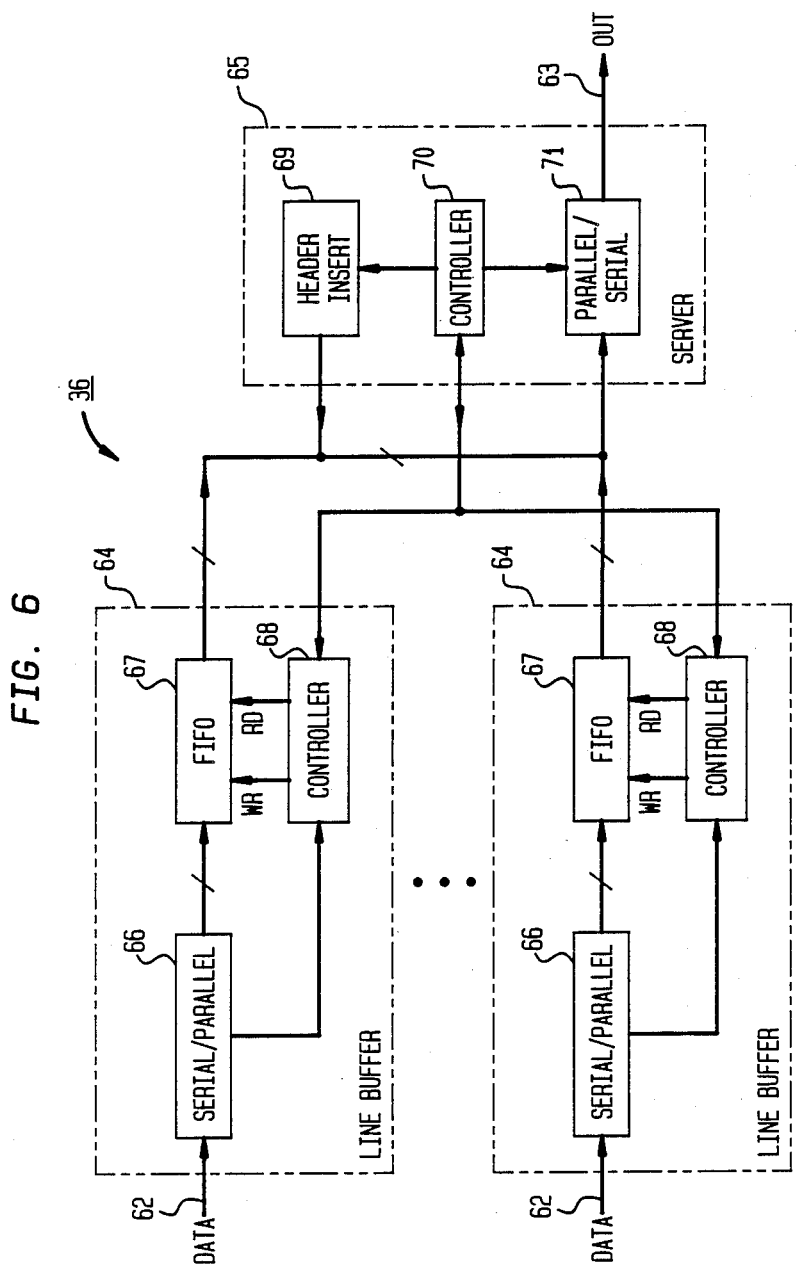
FIG. 6 illustrates a multiplexer for combining a plurality of DTDM bit streams into a single more densely occupied DTDM bit (stream having the same bit rate.

One embodiment of such a DTDM bit stream multiplexer is illustrated in FIG. 6. The DTDM multiplexer 36 of FIG. 6 comprises N input lines 62 (see FIG. 3) and one output line 63 (see FIG. 3). Line buffers 64 recognize and queue incoming DTDM frames. The server 65 looks for newly arrived DTDM frames in the line buffers 64, adds a proper line number in the header field, and sends the frames out in a more densely occupied DTDM bit stream.

The primary functions of the line buffers 64 are recognition and queuing of incoming DTDM frames. Each line buffer contains a serial/parallel converter 66 for converting incoming serial DTDM frames into parallel form and a first-in, first-out buffer 67 with capacity for multiple frames. A timing and control circuit 68 operates the line buffer and interfaces it with the server.

The main functions of the server 65 are to look for newly arrived DTDM frames in the line buffers, to modify the header field to include a line number, and to place the DTDM frame in a more densely occupied DTDM bit stream. The server comprises a header insert circuit 69 for modifying the header field of the DTDM frames, a controller circuit 70 for interfacing with the line buffers 64, and a parallel to serial converter 70. The operations of the server are pipelined; while the server reads a DTDM frame from a line buffer and places it in an outgoing DTDM stream, it continues searching line buffers for DTDM frames. It should be noted that the multiplexer of FIG. 6 is useful for multiplexing packets in non-DTDM transmission formats in addition to being useful for DTDM bit streams.

Another possible architecture for a multiplexer capable of combining several relatively sparsely occupied DTDM bit streams into a more densely occupied DTDM bit stream of the same bit rate builds on the architecture of the DTDM bit stream assembler 32 of FIG. 4. Each input to an interface unit 50 of FIG. 4 is replaced by a serial data link on which a DTDM bit stream arrives. The data packets contained in the frames comprising the incoming DTDM bit stream contend for output frames in an outgoing DTDM bit stream. The frames comprising the outgoing DTDM bit streams are generated by the framer 52 and passed along the chain of interconnected framers 53. The interface units 50 insert data packets from incoming DTDM frames into the frames of the outgoing bit stream to form a more densely occupied DTDM bit stream. The contention for output frames is resolved automatically by the daisy-chained connection of the framer units. Note that no packetizer is needed in the interface units, and the length of each FIFO is preferably more than two frames to prevent data packets contained in incoming frames from being lost.

Figure 7:
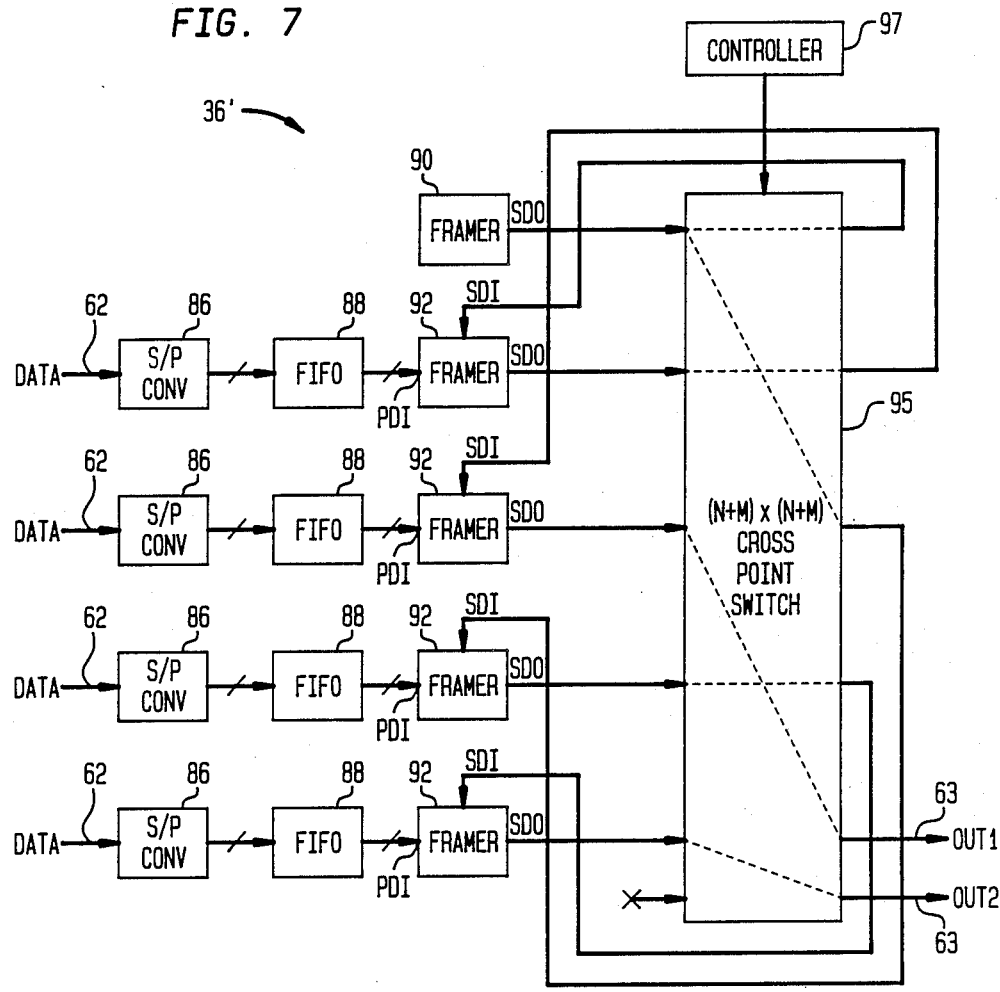
FIG. 7 illustrates an N:M multiplexer for combining a plurality of DTDM bit streams, in accordance with an illustrative embodiment of the invention.

FIG. 7 schematically illustrates an alternative DTDM bit stream multiplexer for combining a plurality of relatively sparsely occupied DTDM bit streams into a smaller number of more densely populated DTDM bit streams of the same bit rate. The multiplexer 36' of FIG. 7 has the flexibility to receive N input DTDM bit streams and to transmit M output DTDM bit streams, which allows M output lines to be shared by N input lines. It is known that both the probability of buffer overflow and the average delay for bursty traffic can be significantly decreased by increasing the number of outputs.

Using the multiplexer architecture 36 shown in FIG. 6, it is difficult to build an N:M multiplexer, because the service order is determined by a single central server. However, it is possible to provide a multiplexer system comprising M separate multiplexers of the type shown in FIG. 6, each having N/M input lines and line buffers and one server and associated output line. In contrast, the service order in the multiplexer 36' of FIG. 7 is determined locally, which results in the flexibility of reassigning input lines to different output lines based on the input traffic statistics.

The N:M multiplexer 36' of FIG. 7 comprises a plurality of input lines 62 (see FIG. 3) and a smaller number of output lines 63 (see FIG. 3). DTDM frames arriving on the input lines 62 are converted into a byte wide stream by means of the serial-to-parallel converters 86 and stored in the associated buffers (FIFOs) 88. The operation of the framer units 90, 92 is similar to those in the DTDM bit stream assembler of FIG. 3. Each framer 90, 92 has a parallel data input (pdi), a serial data input (sdi) and a serial data output (sdo). Framer 90, the headend framer unit, doesn't have any input lines connected to it. In normal operation, it continuously sends out a chain of empty frames. The remaining framers 92 take data comprising occupied DTDM frames in the buffers 88, and insert this data into the empty frames generated by the framer 90, so as to combine a plurality of sparsely occupied DTDM bit streams into a smaller number of more densely populated DTDM bit streams.

The N:M multiplexer 36' of FIG. 7 comprises and (N+M)×(N+M) broadcasting cross point switch network 95. The serial data output (sdo) of each framer 90, 92 is connected to an input of the switch, and the serial data input (sdi) of each framer 92 is connected to an output of the switch as shown in FIG. 7. The connections through the switch network are controlled by a dedicated controller 97.

Figure 8:
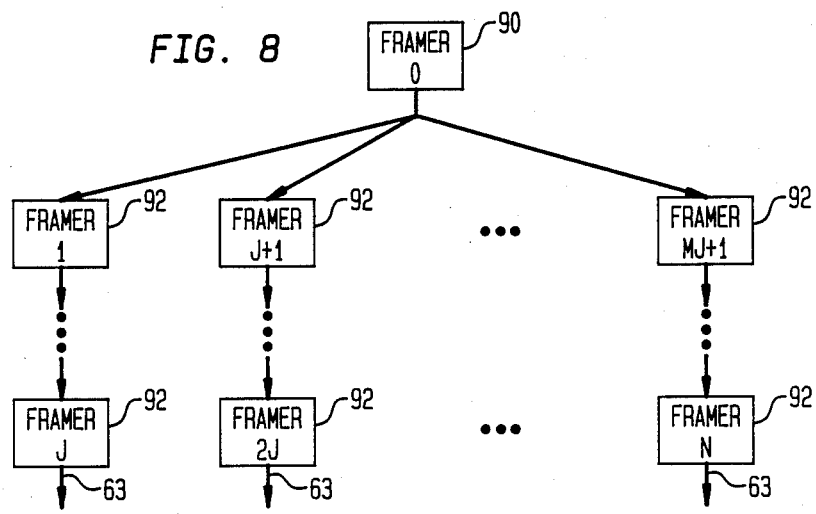
FIG. 8 illustrates how the input lines in the multiplexer of FIG. 7 are grouped.

Illustratively, when the system is initialized, the N input lines 62 are divided into M groups, (1,2 . . . , J), (J+1, J+2, . . . , 2J), . . . , (MJ+1, . . . , (M+1)J), where J=N mod M. The J input lines in each group are logically connected as shown in FIG. 8. Each group of input lines is associated with one output line. Thus, all of the DTDM frames arriving at the inputs of one group are merged into a single DTDM bit stream which leaves via the associated output. The topmost framer unit 92 in each group receives empty frames broadcast from the framer 90. Each frame is then passed through the switch 95 from one framer in the group to the next framer in the group. If a particular FIFO 88 has data comprising a DTDM frame and the associated framer 92 receives an empty frame, the data is inserted into the empty frame. Thus, within each group service priority is ranked in descending order with the higher priorities near the top. Ultimately, M relatively densely occupied DTDM bit streams leave the multiplexer of FIG. 6 via the outputs 63.

Thus, with the addition of the cross point switch, more than one framer 92 receives empty frames from the framer 90 at the same time. This achieves the N:M multiplexing function automatically and with minimal complexity.

If the input lines are not grouped so as to distribute output traffic evenly, the input lines can be regrouped easily by changing the connections within the switching network 95. For example, a particular input in the first group of inputs may be assigned to any other group, e.g., the second group of inputs, to spread out traffic evenly. The controller 97 must know the traffic statistics of each input line and follow some algorithm to rearrange the inputs and decide the ordering (priority) within each group.

The DTDM multiplexer FIG. 7 may route DTDM frames arriving on the same input line to different output lines. For example, n frames arriving on an input line have been sent to output #1. But the (n+1)th frame may be switched to output #2 because reconfiguration took place to balance traffic among the output lines. This may cause an out of sequence problem if the (n+1)th frame arrives at the receive end before the nth frame does. The cost to reorder the frame sequence at the output end may be high. Illustratively, to avoid this problem, one rule may be followed: the input lines carrying services with high bit rate information, such as video, will not be switched from one input line group to another during the service period. For a low bit rate service, such as voice at 64 Kb/s, even if two consecutive frames containing data are dispatched onto two different output lines, the two frames from such a bursty service will be separated by more than several hundred frame intervals. Hence, it is unlikely for there to be an out of sequence problem in this case.

It should be noted that multiplexer architecture of FIG. 7 may be used to multiplex other types of traffic besides DTDM traffic. For example, streams of data packets may be multiplexed together to form more densely occupied streams.

Figure 9:
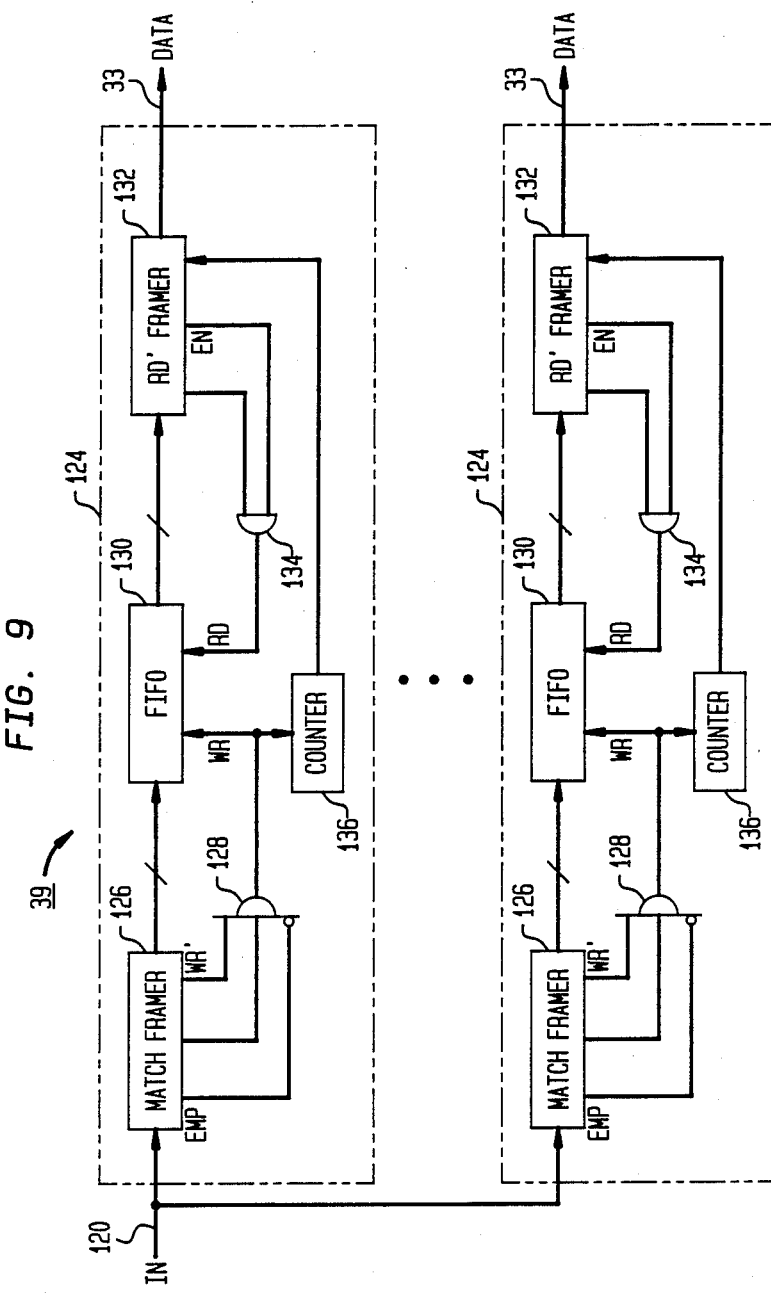
FIG. 9 illustrates a demultiplexer for separating a densely, occupied DTDM bit stream into a plurality of less densely occupied DTDM bit streams.

Turning now to FIG. 9, the DTDM bit stream demultiplexer 39 of FIG. 3 is illustrated in greater detail. The function of the DTDM bit stream demultiplexer 39 is to separate a relatively densely occupied incoming DTDM bit stream into a plurality of relatively sparsely occupied outgoing DTDM bit streams of the same bit rate so that the user data in the frames can ultimately be transported to the proper customer premises devices.

The demultiplexer 39 of FIG. 9 has one input line 120 (see FIG. 3) and a plurality of output lines 33 (see FIG. 3). Each output line 33 is connected to the input line 120 by means of an associated interface 124. Any incoming DTDM frame is simultaneously received by the framer unit 126 in each interface 124. The frame occupancy and line identification number of each incoming DTDM frame are examined by the framers 126. If the frame is not empty and the line number is matched, the packet contained therein will be written into the FIFO 130 under the control of logic 128 and then read out of the FIFO 130 by the framer 132 at the output end of the interface 124 under the control of logic 134. Otherwise, the packet is simply discarded. In this manner, the data from each incoming frame is routed to the correct output line. A counter 136 in each interface is used to count the number of bytes written into the FIFO 130 and generates a signal when a full packet is stored in the FIFO. This signal will inform the output framer 132 to start reading the packet in the FIFO. The framer 132 will assert the "en" signal during the reading of the entire packet. The framers 132 generate sequences of DTDM frames. These sequences of frames leave the framers 132 via the serial data outputs and form the outgoing DTDM bit streams on the lines 33. When data packets are present in the FIFOs 130 they are inserted into the frames generated by the framers 132. In particular embodiments of the demultiplexer, the functions of the framer units 126, 132 may be performed by a single framer unit.

5. Time Division MUXDEMUS for DTDM Bit Stream

After relatively sparse DTDM bit streams are concentrated into more densely populated DTDM bit streams using for example, the DTDM multiplexer 36 of FIG. 3, a plurality of such more densely populated bit streams may be time division multiplexed into a higher speed data stream using, for example, the time division multiplexer 42 of FIG. 3. Such high speed data channels may be used for communications to and from central offices.

Usually, the most challenging work in a time division multiplexing system is to synchronize all incoming bit streams so that they have a common bit rate before they are interleaved into a higher bit rate stream. Typically, the input bit streams have the same nominal center frequency but drift independently a small amount from the center frequency. The conventional way to overcome the asynchronization among the input bit streams is positive bit or byte stuffing. The frequency of the high speed output bit stream is made greater than the product of the nominal center frequency and the number of input tributaries. There is usually a bit or byte position reserved for the occasional stuffing of a dummy bit or byte. Also, there is some control overhead used to indicate if the bit or byte at the stuffing position is valid.

By taking advantage of the fact that the frames comprising each input DTDM bit streams are not 100% occupied, the frequency of the higher speed output bit stream can be made exactly equal to the nominal center frequency of the input tributaries times the number of the input tributaries. In the case of a DTDM system, this can be accomplished through the positive and negative stuffing of DTDM frames. Since the frequency of each input tributary signal can be adjusted in the positive or negative direction through the insertion or removal of an empty DTDM frame, it is possible to make the frequency of the high speed multiplexed bit stream exactly an integer multiple of the nominal input tributary frequency.

Figure 10:
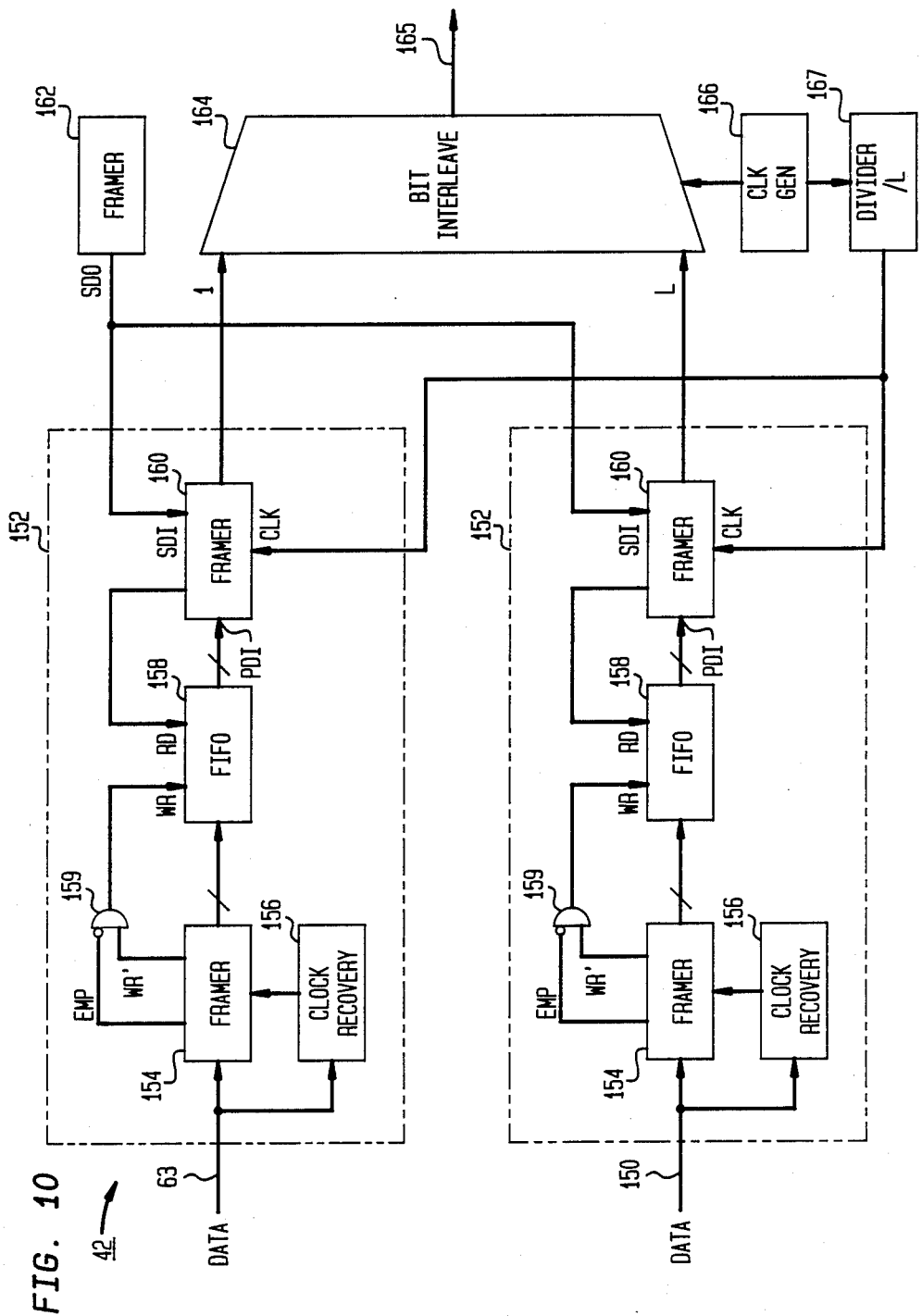
FIG. 10 illustrates a multiplexer for point-to-point transmission.

A time division multiplexer 42 (see FIG. 3) for multiplexing a plurality of DTDM bit streams is illustrated in FIG. 10. Each input 63, 150 (see FIG. 3) is connected to an interface unit 152. Each interface unit 152 comprises a framer 154 which is clocked by a clock signal derived from a clock recovery circuit 156. The derived clock, which is the actual frequency of the tributary, may differ slightly from the nominal tributary frequency as discussed above. This difference between the nominal and actual frequencies is eliminated in the interface unit. Each incoming DTDM frame will be examined by the framer 154 in the associated interface 152 for its occupancy. The data packets contained in the occupied frames will be written into the FIFO 158 under the control of logic 159 and read out later by the framer 160 at the output end of the interface unit 152. Empty frames are discarded.

The reading of the data packets from the FIFOs 158 to the parallel data inputs (pdi's) of the framers 160 is synchronized. The serial data input (sdi) of each framer 160 is connected to the serial data output of a framer 162. The framer 162 serves to broadcast empty frames to the framers 160 so that each framer 160 receives a synchronous chain of empty frames at the nominal tributary frequency. The empty frames received by each framer unit 160 are filled with data packets from the associated FIFO 158 to produce synchronized tributary bit streams at the nominal tributary frequency.

If the actual frequency of a particular tributary is less than the nominal center frequency then on occasion, the associated FIFO 158 will not have a packet to insert into an empty DTDM FRAME. The net effect is that an empty DTDM frame is added so that the tributary acquires a frequency equal to the nominal frequency. However, if the actual frequency of the tributary is larger than the nominal center frequency the net effect is that empty DTDM frames are dropped so that the tributary acquires a frequency equal to the nominal frequency. Illustratively, the difference between the actual and nominal tributary frequency is on the order of ten parts per million. In this case, a two frame capacity FIFO 158 is sufficient as long as each input tributary has one empty frame in $10^5$.

All of the framers 160 send out frames at the same time, with frame alignment being automatically achieved. The aligned frames are then bit interleaved using bit interleaving circuit 164 to produce a single high bit rate bit stream at output 165 (see FIG. 3). Note that the clocks of the framers 160 are connected together so that data bits coming from the framers 160 are phase aligned and can be bit interleaved directly. The clock for the framers 160 is provided by the clock generator 166 and frequency divider 167. In an alternative embodiment of a time division multiplexer, instead of bit interleaving, frame or byte interleaving may also be used. If the frame interleaving is used the multiplexing output bitstream has the same DTDM frame structure, thereby allowing the flexible single transport architecture to grow as to technology advances.

Figure 11:
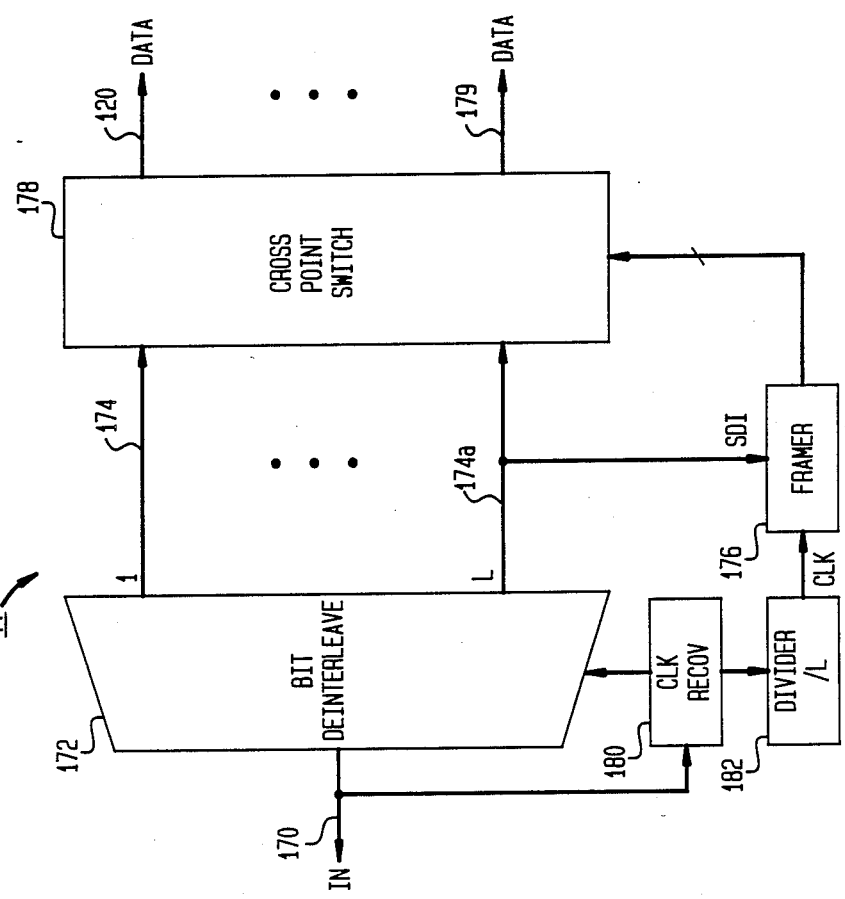
FIG. 11 illustrates a demultiplexer for use in connection with point-to-point transmission.

A time division demultiplexer 44 (see FIG. 3) for demultiplexing the high speed bit stream is illustrated in FIG. 11. The high speed data stream arrives on input line 170 (see FIG. 3) and is bit deinterleaved by means of bit deinterleave circuitry 172 into several lower speed tributary bit streams which are transmitted outward on lines 174. In order to dispatch the bits to correct tributaries, a predetemined span identification (SP ID) is inserted for each tributary before they are multiplexed at the transmit side. The tributary present on line 174a is connected to a framer unit 176, which will detect the frame boundary and determine by examining the span identification whether or not the bit deinterleave circuitry has correctly aligned the incoming bit stream so that appropriate data goes to appropriate output tributaries. If not, either a skip pulse is generated to rotate the bit sequence or a signal is generated by the framer 176 and sent to a cross point switch 178 to reassign the order of the bit stream. The bit streams with correct bit assignments appear at outputs 120, 179 (see FIG. 3). Alternatively, instead of the crosspoint switch 178, a barrel shifter may be used. It should be noted that the clock for the bit deinterleave circuit 171 and framer 176 is provided by clock recovery circuit 180 and frequency divider 182. Demultiplexers which operate according to similar principles are disclosed in R. J. Boehm et al. "Standardized Fiber Optic Transmission Systems—A Synchronous Optical Network View" IEEE Journal on Selected Areas in Communications VOL SAC-4 No. 9 pp 1424–1431 Dec. 1986 and L. R. Linnell "A Wide-band Local Access System using Emerging-technology Components" *IEEE Journal on Selected Areas in Communications* VOL SAC-4 No. 4 pp 612–618 July 1986.

6. The Framer Circuit

The framer unit is an important component for the implementation of specific embodiments of the assemblers, disassemblers, multiplexers and demultiplexers which comprise the DTDM network discussed above.

The framer unit performs a number of functions in the DTDM network, including generating trains of empty DTDM frames, enabling the writing of data packets into specific DTDM frames, and the examination of header data in specific DTDM frames to generate signals for the control of peripheral circuits (e.g. in a DTDM demultiplexer to determine if data in a particular DTDM frame belongs to particular customer premises equipment or a particular less densely occupied DTDM bit stream). All of these functions may be carried out by the framer unit discussed below.

Figure 12:
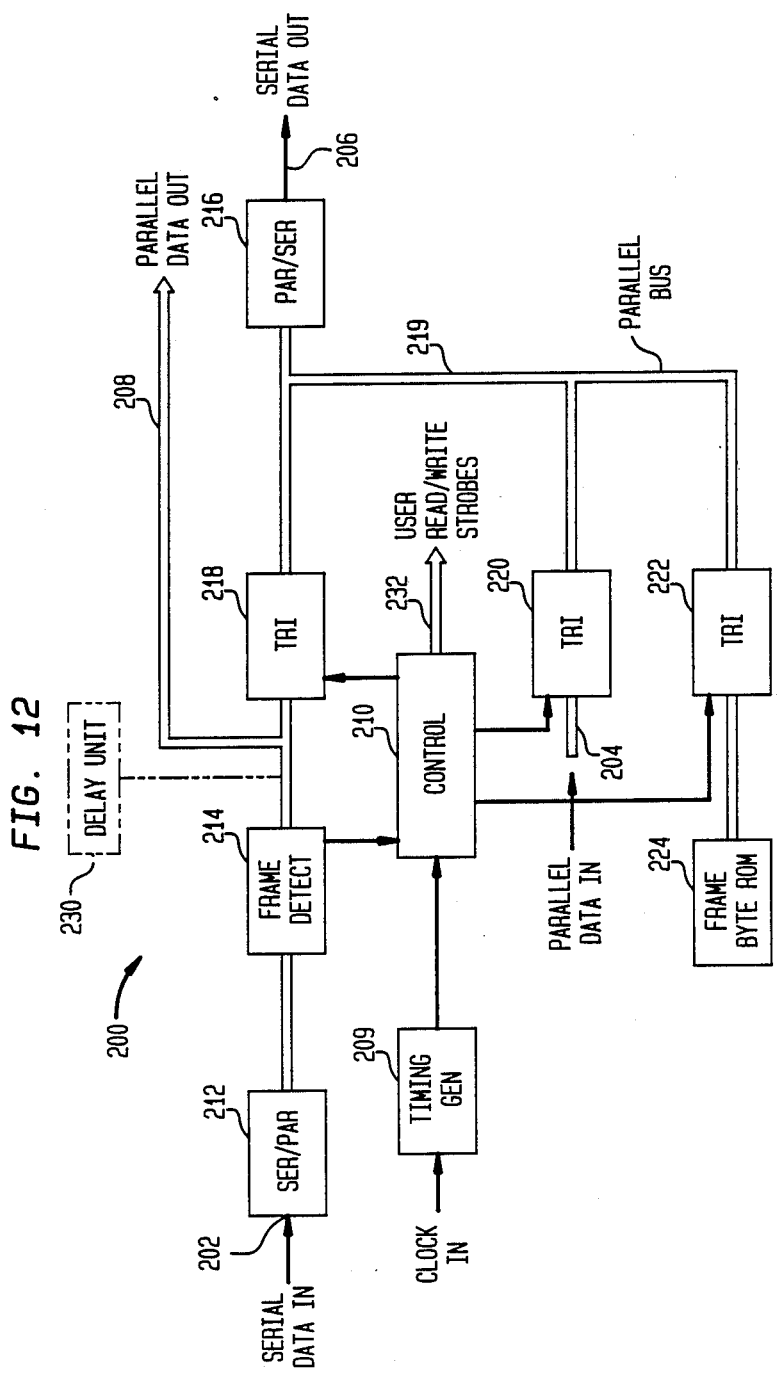
FIG. 12 illustrates a framer circuit.

A framer unit 200 is schematically illustrated in FIG. 12. Illustratively, the framer unit 200 is formed as a single chip. The framer unit 200 has a serial data input 202, a parallel data input 204, a serial data output 206 and a parallel data output 208. Timing information for the framer unit 200 is provided by timing generator 209. The framer 200 operates under control of a control unit 210 which illustratively comprises one or more finite state machines.

As indicated above, a plurality of framer units may be connected in a daisy chain fashion and DTDM frames may be passed from one framer to the next (see e.g., framers 53 of FIG. 4). Data may be written into an empty DTDM frame as follows. A DTDM frame is received at the serial input 202. The DTDM frame is converted to parallel form by serial-to-parallel converter 212 and is detected by frame detector 214. The frame detector 214 is in communication with the control 210 and illustratively communicates to the control 210 information such as whether or not the frame is empty. Illustratively, the DTDM frame leaves the framer unit via the serial output 206 after conversion to serial form by way of parallel-to-serial converter 216. However the frame cannot reach the parallel-to-serial converter 216 unless the control 210 applies a signal to the tristate device 218.

The data to be written into the frame is received at the parallel data input 204 (illustratively from a FIFO 57 in the DTDM bit stream assembler 32 of FIG. 4). If the particular DTDM frame is empty and data is available at the parallel input 204, a signal is applied by the control 210 to the tristate device 220 to enable the data to be inserted into the particular DTDM frame via bus 219 before it leaves the framer unit. However, if the DTDM frame is already full the control does not provide such a signal to the tristate 220. In particular framer units additional information such as span identification may be inserted into specific DTDM frames by means of an additional tristate unit not shown.

The framer unit 200 may also be utilized to generate a chain of empty DTDM packets (see e.g., framer 52 in FIG. 4). In this case the serial input 202 and associated serial-to-parallel converter 212 are not utilized. Instead, the control 210 applies a periodic signal to tristate 222 so that a frame alignment word is periodically read from frame byte ROM 224 and transmitted via bus 219 to parallel-to-serial converter 216 and serial output 206 so as to define a train of empty DTDM frames. Other information comprising the transmission overhead (T) field of the DTDM frame may also be stored in ROM 224 or provided by other sources connected to the bus 219 via a tristate device operative under the control of the control unit 219.

In particular situations (see e.g., framers 70 of FIG. 5 and 126 of FIG. 9), a framer unit receives occupied DTDM frames and the header (H) or transmission overhead (T) fields have to be examined to control peripheral circuit operations such as the reading of data into a FIFO. In this case, a multiple byte delay unit 230 may be included in the path between the serial input 202 and the parallel and serial outputs 208, 206. Typically a frame arrives at the serial input 202 and is converted to parallel form by the serial-to-parallel converter 212. The frame detector detects the frame and supplies necessary information from the header or transmission overhead fields to the control unit 210 which issues appropriate control signals via lines 232 such as user read/write strobes. Illustratively, the user read/write strobes control the writing of data from DTDM frames in the framer unit into associated FIFOs or other buffers. If the FIFO has byte wide format, the parallel output 206 may be used for this purpose. The delay unit 230 is used to insure that the necessary signal processing takes place before the DTDM frame leaves the framer unit.

7. Conclusion

A multiplexer for combining a plurality of sparsely occupied DTDM bit streams into a smaller number of more densely occupied DTDM bit streams of the same bit rate has been disclosed.

Finally, the above described embodiments of the invention are intended to be illustrative only. Numerous alternative embodiments may be devised by those skilled in the art without departing from the spirit and scope of the following claims.

What is claimed is:

1. A multiplexer for combining a plurality of relatively sparsely occupied incoming bit streams comprising input frames into a smaller number of more densely occupied outgoing bit streams comprising output frames, said multiplexer comprising:
   a cross-point switch having a plurality of input lines corresponding to the number of incoming streams,
   a plurality of input means connected to said switch through said input lines for receiving said incoming bit streams, said input means being divided into groups defined by settings of said cross-point switch, and
   a plurality of output lines connected to said switch for transmitting said outgoing bit streams, said incoming bit streams arriving on each one of said groups of input means being combined into one outgoing bit stream transmitted on each corresponding one of said output lines associated with said each one of said groups,
   said cross-point switch being adapted to generate a chain of empty output frames for said each one of said groups and to transmit each said chain by sequencing through each said input means to each of said input lines associated with said each one of said groups so that data from said incoming streams can be inserted therein to form said outgoing streams.

2. The multiplexer of claim 1 wherein said input frames comprising said incoming streams and said output frames comprising said outgoing streams are DTDM frames.

3. The multiplexer of claim 1 wherein said multiplexer further includes control means for changing settings of said cross-point switch to rearrange said groups of input lines.

4. The multiplexer of claim 1 wherein each of said input means includes
   buffer means for storing input frames comprising one of said incoming bit streams, and
   circuit means for receiving said chain of frames comprising the associated outgoing bit stream and for inserting data from said input frames stored in said buffer into said chain of output frames comprising said associated outgoing bit stream.

5. The multiplexer of claim 1 wherein said incoming bit streams and said outgoing bit streams have the same bit rate.

6. A multiplexer for combining a plurality of relatively sparsely occupied incoming bit streams having a particular bit rate and comprising input frames into a smaller number of more densely occupied outgoing bit streams having said bit rate and comprising output frames, said multiplexer comprising
   a cross-point switch having plurality of input lines corresponding to the number of incoming streams, and
   a plurality of input means connected to said switch through said input lines for receiving said incoming bit streams, said input means being divided into groups defined by settings of said cross-point switch,
   said cross-point switch being adapted to generate a chain of empty output frames for each one of said groups of input means and to transmit each said chain of frames for said each one of said groups of input means, each output frame in said chain being transmitted via said cross-point switch by sequencing through each said input means to each of said input lines corresponding to said each one of said groups, each of said input means including circuit means for receiving said chains of frames and for inserting data from said input frames into said output frames in said chains to form said outgoing bit streams.

7. The multiplexer of claim 6 further comprising framer circuit means connected to an input of said crosspoint switch for applying a stream of empty frames through settings of said switch to specific outputs of said switch to form said chain of empty output frames.

* * * * *

UNITED STATES PATENT AND TRADEMARK OFFICE
CERTIFICATE OF CORRECTION

PATENT NO. : 4,855,999

DATED : August 8, 1989

INVENTOR(S) : Hung-Hsiang J. Chao

It is certified that error appears in the above-identified patent and that said Letters Patent is hereby corrected as shown below:

Column 1, line 16 after "Becker," insert --H. J. Chao--.
Column 6, line 49 "aributary" should read --tributary--;
         line 54 "bit(stream" should read --bit stream--
Column 8, line 32 "2" should read --22--;
         line 37 "th" standing alone should read --the--.

Signed and Sealed this

Tenth Day of May, 1994

Attest:

BRUCE LEHMAN

Attesting Officer     Commissioner of Patents and Trademarks